United States Patent [19]

Pitchford

[11] 3,986,887

[45] Oct. 19, 1976

[54] PAVING COMPOSITIONS
[75] Inventor: Armin C. Pitchford, Bartlesville, Okla.
[73] Assignee: Phillips Petroleum Company, Bartlesville, Okla.
[22] Filed: Aug. 23, 1972
[21] Appl. No.: 282,933

[52] U.S. Cl.............................. 106/273 R; 106/276; 106/279; 106/280
[51] Int. Cl.² ..................... C08L 95/00; C09D 3/24
[58] Field of Search ............ 106/276, 279, 280, 273

[56] References Cited
UNITED STATES PATENTS
2,691,621  10/1954  Gagle................................. 106/279
FOREIGN PATENTS OR APPLICATIONS
614,900  2/1961  Canada.............................. 106/276

Primary Examiner—Joseph L. Schofer
Assistant Examiner—Herbert J. Lilling

[57] ABSTRACT

Bituminous compositions suitable for road paving materials characterized by a Penetration Ratio of at least 25 and a minimum viscosity at 275° F. in the range from about 50 Saybolt Furol Seconds to about 120 Saybolt Furol Seconds, depending upon the penetration grade of the bituminous material, are produced by blending a vacuum-reduced naphthenic asphalt and a residual asphalt having a lower penetration but a higher viscosity than the vacuum-reduced naphthenic asphalt.

9 Claims, No Drawings

PAVING COMPOSITIONS

This invention relates to bituminous compositions. More particularly, the present invention relates to modified asphalt compositions which are suitable for use as paving materials.

Bituminous materials such as asphalts are widely used as a covering material for the construction of roads. Depending upon their source, asphalts can exhibit different physical properties which can be attributed to corresponding variations in the composition and structure of the residual fraction of the crude from which they are derived. Some of these differences, such as viscosity, penetration, ductility, and the like, are limited by specifications promulgated by regulatory agencies, such as state highway departments, and it becomes necessary to alter one or more of such properties in order to meet the requirements. Among the common requirements of such regulatory agencies is that an asphaltic cement, when used for paving roads, must have a minimum viscosity ranging from about 50 Saybolt Furol Seconds (SFS), at 275° F. to about 120 SFS at 275° F., depending upon the penetration grade of the asphaltic material, and a minimum Penetration Ratio of 25, regardless of penetration grade.

Normally, these requirements can be satisfied by oxidizing, such as by air blowing, the asphalt. However, many asphaltic stocks do not respond sufficiently to oxidation treatments and other means for increasing the Penetration Ratio and viscosity must be employed. One such method for accomplishing this objective is the use of rubber additives. In addition to increasing product cost, sometimes prohibitively, dispersion of rubber into the asphalt is quite difficult, i.e., the particular means of effecting the combination has been either unsatisfactory and cumbersome or has not resulted in a homogeneous blend, and some thermoplastic polymers which can be more readily dispersed into the asphalt are not always effective.

It is an object of this invention to provide modified asphalt compositions suitable for paving purposes.

It is another object of this invention to provide modified asphalt compositions characterized by a Penetration Ratio of at least 25, regardless of penetration grade, and a minimum SFS viscosity at 275° F. in the range from about 50 SFS to about 120 SFS, depending upon the penetration grade of the asphaltic material.

It is another object of this invention to provide a method for the manufacture of an asphaltic composition suitable for use as a paving material.

It is another object of this invention to provide a method for the manufacture of an asphaltic composition characterized by a Penetration Ratio of at least 25, regardless of penetration grade, and a minimum SFS viscosity at 275° F. in the range from about 50 SFS to about 120 SFS, depending upon the penetration grade of the asphaltic material.

These and other objects of the invention will be readily apparent to persons skilled in the art upon the reading of the present specification and appended claims.

In accordance with the present invention, there is provided a paving grade asphalt characterized by Penetration Ratio and viscosity (SFS) values within limits promulgated by agencies regulating the use of asphaltic materials for paving purposes. Broadly, such paving grade asphalts are provided by blending vacuum-reduced naphthenic asphalts with a second asphaltic material, the second asphaltic material being characterized by an asphaltene content in excess of 20 weight percent. In a more preferred embodiment, the second asphaltic material is further characterized by a lower penetration at 77° F. and a higher viscosity (SFS) at 275° F. than the naphthenic asphalt with which it is blended. In a still more preferred embodiment, the naphthenic asphalt component will have a penetration at 77° F. within the range specified by the regulatory body. The blends of this invention are characterized by having a penetration at 77° F. greater than the corresponding penetration of either the vacuum-reduced naphthenic asphalt or the second asphaltic components of the blend; in other words, the final compositions are softer than the starting materials. Optionally, either or both of the different types of asphalts which can be used in forming the modified asphalt compositions can have incorporated therein a flux oil.

The naphthenic asphalts which are suitable for use in the practice of the present invention are selected from the group consisting of petroleum asphalts derived from the vacuum reduction of naphthenic base crude oils. Preferably, such naphthenic asphalts will have a penetration at 77° F. within the range promulgated by the regulatory agency for the particular paving use for which the modified asphalts of this invention are designed. In other words, if the particular use for the asphalt compositions call for a specification of penetration at 77° F. in the range of 85–100, the starting naphthenic asphalts will preferably exhibit a penetration at 77° F. in the range of 85–100. Even more preferably, the naphthenic asphalt component will have a Saybolt Furol Seconds viscosity at 275° F. which is preferably lower than minimum viscosity (SFS) at 275 values set forth by the regulatory agency for asphaltic compositions having the penetration of the naphthenic asphalt; and may have a Penetration Ratio below the level required by the regulatory agency. Thus, preferably, the naphthenic asphalt component of the modified blends are selected from the group consisting of petroleum asphalts derived from the vacuum reduction of naphthenic base crude oils, said asphalts having a penetration at 77° F. in the range of 40–50 and a viscosity (SFS) at 275° F. of less than 120, a penetration at 77° F. in the range of 60–70 and a viscosity (SFS) at 275° F. of less than 100, a penetration at 77° F. in the range of 85–100 and a viscosity (SFS) at 275° F. of less than 85, a penetration at 77° F. in the range of 120–150 and a viscosity (SFS) at 275° F. of less than 70, and a penetration at 77° F. in the range of 200–300 and a viscosity (SFS) at 275° F. of less than 50; it being understood that naphthenic asphalts having penetrations at 77° F. and/or viscosity (SFS) at 275° F. values outside the aforementioned ranges can be employed in the practice of this invention. While mixtures of the naphthenic asphalts can be used, it is preferred that such mixtures be limited to the use of two or more naphthenic asphalts from within the same penetration grade.

To form the modified asphalts of the present invention, the naphthenic asphalt component is blended with a second asphalt selected from the group consisting of petroleum asphalts characterized by an asphaltene content of at least 20 weight percent, and preferably in the range of about 35 to about 60 weight percent. Preferably, the second asphalt component not only has an asphaltene content of at least 20 weight percent, but also is further characterized by a penetration at 77° F. lower than that of the naphthenic asphaltic component and a viscosity (SFS) at 275° F. higher than that of the naphthenic asphalt component; it being understood that the second asphalt component can be softer than the naphthenic asphalt component providing that, notwithstanding such greater softness, it nonetheless has a higher viscosity (SFS) at 275° F. than the naphthenic asphalt. Such petroleum asphalts can be derived from any crude type such as aromatic, intermediate, naphthenic, etc.; and include atmospheric- and vacuum-reduced asphalts; solvent-precipitated, such as with propane, asphalts; thermal asphalts, as from cracking operations on petroleum stock; and air-blown asphalts, including straight-blown and catalytic-blown stocks.

In forming the modified asphalt compositions of the prevent invention, the naphthenic asphalt component will be present in an amount in the range of from about 20 to about 70 weight percent, based on the total weight of asphalt. Preferably, such blends will contain from about 40 to about 60 weight percent naphthenic asphalt component, the particularly beneficial blends having equal weight amounts of the two asphaltic components. Either or both of the individual asphaltic types can have blended therewith any of the known flux oils. When used, the flux oil is preferably present in an amount in the range of about 1.5 to about 15 weight percent, based on total weight of the asphalt, although amounts outside these ranges can be employed if desired or necessary to modify the individual asphalt to permit the use of that asphalt in the practice of the invention.

In forming the blends of the present invention, the individual constituents may be compounded in any desired manner, but the preferred procedure will, of course, depend upon the relative proportions of the two primary constituents as well as the type and quantity of any other liquid or solid additives to be used. The practice of blending being old, specific details will not be discussed herein.

Throughout the specification, in the examples and the appended claims, certain terms of art are used which are defined as follows:

Penetration: ASTM Test D-561 defines the standard procedure utilized to determine this quantity which is the most commonly used test for determining the consistency of a material. The penetration of a bituminous material is the distance in tenths of a millimeter than a standard needle penetrates vertically into a sample of a material under fixed conditions of temperature, load and time. Accordingly, soft materials, such as asphalts, have high penetration values whereas harder materials, such as harder asphalts, have lower penetration values. The penetration is commonly measured at 77° F. (25° C.), 32° F. (0° C.), 39.2° F. (4° C.) and 115° F. (46.1° C.). Under the conditions of ASTM D-561, the conditions of temperature, load and time, respectively, are as follows: 77° F., 100 grams, 5 seconds; 32° F., 200 grams, 60 seconds; 39.2° F., 200 grams, 60 seconds; and 115° F., 50 grams, 5 seconds.

Penetration Ratio: The ratio of the penetration at 77° F. and 39.2° F. as calculated by the formula $$\left( \frac{\text{Penetration at } 39.2° \text{ F.}}{\text{Penetration at } 77° \text{ F.}} \right) \times 100.$$

Penetration Ratio is an expression for comparing the susceptibility of asphalts to changes in consistency with corresponding changes in temperature.

Viscosity: ASTM D 88-56 defines the test utilized to measure viscosity. The Saybolt Viscometer is the most commonly used instrument and it provides a means for measuring the time for 60 milliliters of material to flow through a specified orifice at a predetermined temperature. The viscosity of the material is then the number of seconds reported as Saybolt Furol Seconds (SFS) required for the material to run through the orifice.

Naphthenic Asphalt: The residual product derived from vacuum reduction or solvent extraction of naphthenic crude oil. The oily portion of the asphalt phase will consist primarily of cyclic compounds as opposed to normal paraffins.

Aromatic Asphalts: Those asphalts which contain essentially no paraffinic or naphthenic components. Examples of such asphalts are those produced by solvent extraction of top crude propane, iso- or n-butane to yield paraffinic or naphthenic extracts and a residue comprised of asphaltenes and asphaltic resins.

Vacuum Asphalts: Those asphalts which are residual portions of crude oils produced by vacuum flash distillation in which heavy high boiling oils are removed as heavy oil distillates.

Flux oil: Any heavy oil which can be used to dilute or to plasticize a harder, more viscous asphaltic material. A softer vacuum asphalt which is used to blend with a harder asphalt is often referred to as a flux oil even though little oil, per se, is present.

The objects, advantages and details of the invention will be better understood from consideration of the following experimental data.

EXAMPLE 1

A naphthenic asphalt derived from the vacuum reduction of Coalinga crude oil and a second asphalt derived from a different crude oil than the naphthenic crude oil and having an asphaltene content of 38 weight percent were used to prepare a series of asphaltic paving compositions. The specifications for the individual asphalts, blends containing these asphalts, and paving grade asphalt specifications of a typical regulatory agency (State of California) are shown in Table I.

TABLE I

| | Specifications | | | | | Composition | | | | | | |
|---|---|---|---|---|---|---|---|---|---|---|---|---|
| | I | II | III | IV | V | A | B | C | D | E | E⁽¹⁾ | F | F⁽¹⁾ |
| Composition, wt. % | | | | | | | | | | | | | |
| Naphthenic Asphalt | | | | | | 100 | 92.5 | 95 | 0 | 92.5 | 92.5 | 95 | 95 |
| Flux Oil | | | | | | 0 | 7.5 | 5 | 0 | 7.5 | 7.5 | 5 | 5 |
| Blended Asphalt | | | | | | 0 | 0 | 0 | 100 | 100 | 100 | 100 | 100 |
| Properties: | | | | | | | | | | | | | |
| Penetration at 77° F. | 40–50 | 60–70 | 85–100 | 120–150 | 200–300 | 47 | 95 | 77 | 86 | 107 | 91 | 96 | 81.5 |
| Penetration Ratio | 25+ | 25+ | 25+ | 25+ | 25+ | 21.3 | 25.3 | 24.7 | 48.8 | 36.4 | 30.6 | 36.4 | 36.8 |

TABLE I-continued

| | Specifications | | | | | Composition | | | | | | | |
|---|---|---|---|---|---|---|---|---|---|---|---|---|---|
| | I | II | III | IV | V | A | B | C | D | E | E[1] | F | F[1] |
| Viscosity, SFS, 275° F. | 120–430 | 100–325 | 85–260 | 70–210 | 50–150 | 103.7 | 71.3 | 81.5 | 216 | 111 | 144 | 125.1 | 148.8 |

[1]Indicated values are those predicted for blend.

From the foregoing data, it will be noted C) the naphthenic asphalt (Composition A) by itself fails to meet the specification requirements for 40–50 penetration at 77° grade paving asphalt, being deficient in penetration ratio and viscosity (SFS) at 275° F. A blend of 92.5 parts by weight of the 47 penetration naphthenic asphalt and 7.5 parts by weight of a conventional flux oil (Composition B) fails to meet the specification requirements for 85–100 penetration grade paving asphalt, being deficient in viscosity. A blend (Composition C of 95 parts by weight of naphthenic asphalt and 5 parts by weight of the same flux oil used in making Composition B fails to meet the Penetration Ratio minimum requirement of 25. By extrapolation, Composition C also has a lower viscosity than would be required for a 77 penetration grade asphalt.

The blending asphalt having an asphaltene content of 38 weight percent (Composition D) meets the requirements for 85–100 penetration grade paving asphalt.

A blend (Composition E) of 50 parts by weight of Composition B containing the naphthenic asphalt component and 50 parts by weight of the blending asphalt (Composition D) meets the specification requirements of Penetration Ratio and viscosity (SFS) at 275° F., but is softer (penetration at 77° F. of 107) than is permitted, thus indicating either the use of a harder naphthenic asphalt than the 95 penetration of Composition B or a harder second asphalt than Composition D. The use of a harder naphthenic asphalt (Composition C) with the asphalt of Composition D provides a modified asphalt (Composition F) which meets all of the California specifications for 85–100 grade paving asphalt.

Generally, the properties of asphalt blends can be arithmetically predicted as an approximate average of the properties of the individual components. Thus, blending of the asphalt types was expected to produce compositions having properties intermediate those possessed by the individual components. As the data demonstrates, the penetrations of blends of a naphthenic asphalt and an asphalt having an asphaltene content greater than 20 weight percent is higher, i.e., softer, than anticipated.

EXAMPLE II

A naphthenic asphalt having a penetration at 77° F. of 140 derived from the vacuum distillation of Coalinga crude oil was blended with an equal weight amount of a second asphalt having a penetration at 77° F. of 86 and an asphaltenes content of 38 weight percent to provide a modified asphalt composition which meets all of the California requirements for 120–150 grade asphalt paving compositions. The specifications for the individual asphalts, the blend of these asphalts and the California specification requirements are shown in Table II.

TABLE II

| | | Asphaltic Composition | | | | | | | |
|---|---|---|---|---|---|---|---|---|---|
| | Specifications | G | H | I | J | K | L | M | M[1] |
| Composition, wt. %: | | | | | | | | | |
| Naphthenic Asphalt | | 100 | 0 | 80 | 75 | 70 | 65 | 50 | 50 |
| Blended Asphalt | | 0 | 100 | 20 | 25 | 30 | 35 | 50 | 50 |
| Properties: | | | | | | | | | |
| Penetration at 77° F. | 120–150 | 140 | 86 | | | | | 132 | 113 |
| Penetration Ratio | 25+ | 32.1 | 48.8 | | | | | 36.3 | 40.5 |
| Viscosity, SFS, 275° F. | 70–210 | 54.6 | 216 | 54.6 | 69.5 | 74.8 | 81.8 | 100.7 | 135 |

[1]Indicated values are those predicted for the composition.

The foregoing example demonstrates a two-stage process of the invention for preparing specification grade asphalt comprising yielding the desired penetration grade of asphalt desired by vacuum distillation of naphthenic crude oil stock, with blending of a flux oil, if necessary, and subsequent blending of the naphthenic asphalt with a harder or lower penetration asphalt having an asphaltene content of at least 20 weight percent in sufficient quantities to give the necessary penetration value, Penetration Ratio and viscosity (SFS) at 275° F. It will be noted that the penetration of the blend is greater than the expected, i.e., calculated or arithmetic mean, value.

EXAMPLE III

A naphthenic asphalt derived from the vacuum reduction of Coalinga crude oil and a second asphalt derived from a different crude oil than the naphthenic asphalt and having an asphaltene content of less than 15 weight percent were used to prepare asphaltic paving compositions. The specifications of the individual asphalts, blends containing these asphalts, and paving grade asphalt specifications of a typical regulatory agency (State of California) are shown in Table III.

TABLE III

| | | Asphaltic Composition | | |
|---|---|---|---|---|
| | Specifications | N | O | P |
| Composition, wt. %: | | | | |
| Naphthenic Asphalt | | 100 | 0 | 50 |
| Blended Asphalt | | 0 | 100 | 50 |
| Properties: | | | | |

TABLE III-continued

|  | Specifications | | | Asphaltic Composition | | |
|---|---|---|---|---|---|---|
|  |  |  |  | N | O | P |
| Penetration at 77° F. | 40–50 | 85–100 | 120–150 | 47 | 146 | 96 |
| Penetration Ratio | 25+ | 25+ | 25+ | 21.3 |  | 27.1 |
| Viscosity, SFS, 275° F. | 120–130 | 85–260 | 70–210 | 103.7 | 122.6 | 107.4 |

It will be noted that Composition P has a penetration at 77° F. intermediate the corresponding penetration of each of the starting materials. Thus, this example demonstrates that, while asphalts having an asphaltene content below about 20 weight percent can be used to provide paving grade asphalt compositions, the resulting blends are not softer than either of the asphalts used in preparing such blends.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A paving grade asphalt composition comprising:
from about 20 to about 70 weight percent, based on total weight of asphalt, of a vacuum-reduced naphthenic asphalt; and
from about 80 to about 30 weight percent of a blending asphalt, said blending asphalt having an asphaltenes content of at least 20 weight percent;
said composition being characterized by having penetration at 77° F. and Saybolt Furol Seconds (SFS) viscosity values, respectively, within the ranges selected from the group consisting of

| Penetration at 77° F. | Viscosity, SFS, at 275° F. |
|---|---|
| 40 – 50 | 120 – 430, |
| 60 – 70 | 100 – 325, |
| 85 – 100 | 85 – 260, |
| 120 – 150 | 70 – 210, and |
| 200 – 300 | 50 – 150, | and having a Penetration Ratio of at least 25.

2. An asphalt composition according to claim 1 wherein said blending asphalt is further characterized by a penetration at 77° F. lower than the corresponding penetration of said naphthenic asphalt and a higher Saybolt Furol Seconds viscosity at 275° F. higher than the corresponding viscosity of said naphthenic asphalt.

3. An asphalt composition according to claim 1 wherein said naphthenic asphalt has a penetration at 77° F. within the range selected from the group consisting of 40–50, 60–70, 85–100, 120–150 and 200–300.

4. An asphalt composition according to claim 1 wherein the amounts of said naphthenic asphalt and said blending asphalt are equal.

5. A composition according to claim 1 containing from about 1.5 to about 15 weight percent, based on total weight of asphalt, of a flux oil.

6. A composition according to claim 1 wherein said composition is characterized by a penetration at 77° F. in the range of 120–150, a Penetration Ratio of at least 25, and a Saybolt Furol Seconds viscosity at 275° F. in the range of 70–210, wherein said naphthenic asphalt is characterized by a penetration at 77° F. of 140 and a Saybolt Furol Seconds viscosity at 275° F. of 54.6, and wherein said blending asphalt is characterized by an asphaltene content of 38 weight percent, a penetration at 77° F. of 86, and a Saybolt Furol Seconds viscosity at 275° F. of 216.

7. A composition according to claim 5 wherein said composition is characterized by a penetration at 77° F. in the range of 85–100, a Penetration Ratio of at least 25 and a Saybolt Furol Seconds Viscosity at 275° F. in the range of 85–260, wherein said naphthenic asphalt has incorporated therein 5 weight percent of a flux oil based on the total weight of asphalt and oil, said asphalt-oil blend being characterized by a penetration at 77° F. of 77 and a Saybolt Furol Seconds Viscosity at 275° F. of 81.5, and wherein said blending asphalt is characterized by an asphaltene content of 38 weight percent, a penetration at 77° F. of 86 and a Saybolt Furol Seconds Viscosity at 275° F. of 216.

8. A process for preparing a paving grade asphalt composition characterized by having a Penetration Ratio greater than 25 and a penetration at 77° F. and a Saybolt Furol Seconds Viscosity at 275° F., respectively, within the ranges selected from the group consisting of

| Penetration at 77° F. | Viscosity, SFS, at 275° F. |
|---|---|
| 40 – 50 | 120 – 430, |
| 60 – 70 | 100 – 325, |
| 85 – 100 | 85 – 260, |
| 120 – 150 | 70 – 210, and |
| 200 – 300 | 50 – 150, | comprising the steps of
a. producing a naphthenic asphalt having a penetration within the desired range by the vacuum distillation of a naphthenic base crude oil; and
b. admixing with said naphthenic asphalt a blending asphalt characterized by an asphaltene content of at least 20 weight percent, a penetration at 77° F. lower than the corresponding penetration of said naphthenic asphalt and a Saybolt Furol Seconds Viscosity at 275° F. higher than the corresponding viscosity of said naphthenic asphalt.

9. The process of claim 8 further comprising the step of incorporating into either of said asphalts a flux oil.

* * * * *